United States Patent [19]

Bernauer

[11] Patent Number: 4,668,181
[45] Date of Patent: May 26, 1987

[54] HEATING DEVICE AND PROCESS FOR CONTROLLING THE HEATING DEVICE FOR WEBS TO BE UNWOUND FROM ROLLS

[75] Inventor: Joachim Bernauer, Frankenthal, Fed. Rep. of Germany

[73] Assignee: KMB Kunststoffmetallbearbeitung GmbH, Fed. Rep. of Germany

[21] Appl. No.: 840,656

[22] Filed: Mar. 18, 1986

[30] Foreign Application Priority Data

Sep. 25, 1985 [DE]  Fed. Rep. of Germany ... 8527284[U]

[51] Int. Cl.⁴ .............................................. F26B 13/08
[52] U.S. Cl. ......................................... 432/8; 432/59; 34/41; 34/48; 34/155; 264/40.7; 425/143
[58] Field of Search ..................... 432/8, 59; 264/40.6, 264/40.7, 25, DIG. 65; 425/143; 34/155, 41, 48

[56] References Cited

U.S. PATENT DOCUMENTS

| | | | |
|---|---|---|---|
| 1,170,309 | 1/1916 | Meyers | 34/118 |
| 3,188,066 | 6/1965 | Nordberg et al. | 432/8 |
| 3,793,741 | 2/1974 | Smith, Jr. | 34/68 |
| 4,306,856 | 12/1981 | Arippol | 264/DIG. 65 |

*Primary Examiner*—Larry I. Schwartz
*Attorney, Agent, or Firm*—Harold Pezzner

[57] ABSTRACT

A heater is provided for heating an unwound portion of a web supported at a holder on a rotatable roll. A first pair of rollers between the holder and heater pull the web from the roll. A second pair of rollers advance the web after it passes through the heater.

8 Claims, 1 Drawing Figure

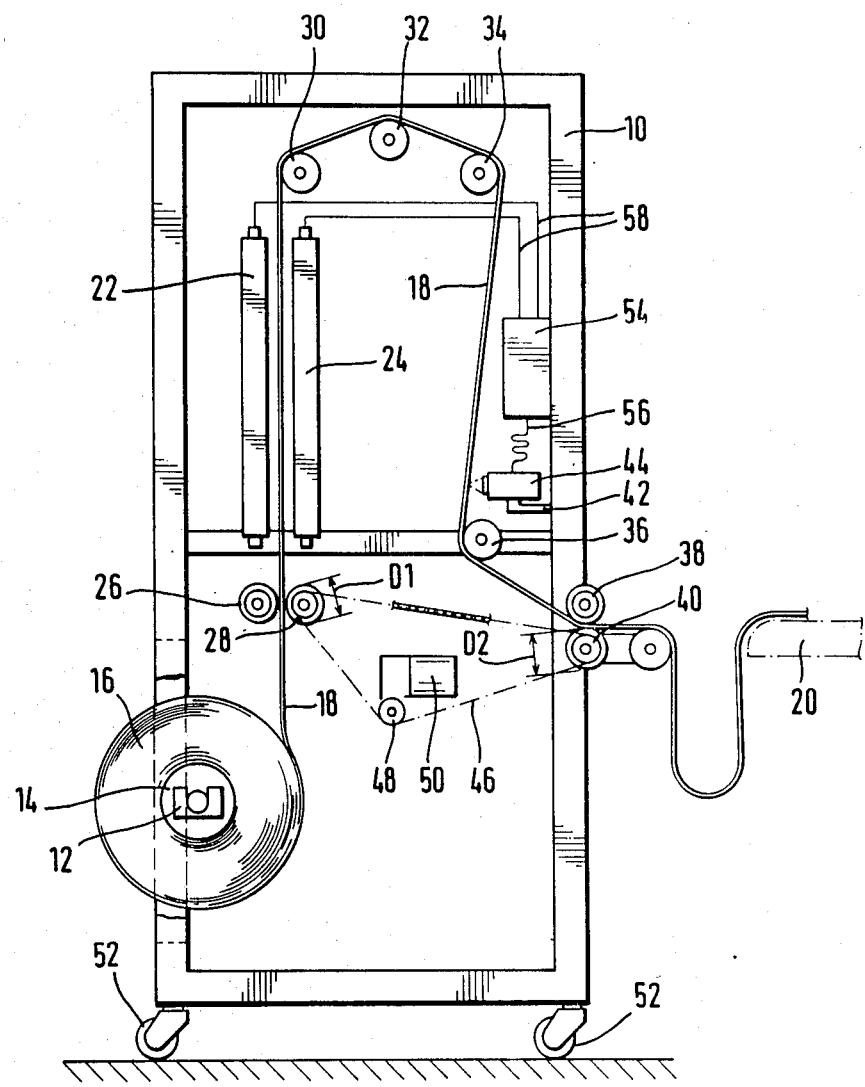

HEATING DEVICE AND PROCESS FOR CONTROLLING THE HEATING DEVICE FOR WEBS TO BE UNWOUND FROM ROLLS

BACKGROUND OF THE INVENTION

The present invention pertains to a heating device for webs to be unwound from rolls, comprising a holder for rotatably supporting a roll with a web wound up on it and a heater for acting on an unwound area of said web.

The present invention also pertains to a process for controlling the heating device.

During the shaping of plastics according to the so-called deep-drawing process, flat plastic webs or films are transformed into simple three-dimensional molded bodies. The deformation process takes place in the heated state of the web.

In the known deep-drawing processes, the plastic webs are in rolls. The plastic web is unwound from the roll during the processing. The roll proper is not driven, but is set into rotary movement by the plastics processing station in the course of the work rhythm by timed pulling of the web. The roll is consequently set into jerky rotary movement. since the mass of the web put into rotary movement decreases during the unwinding, pulling of the web even with constant force does not lead to equal angles of rotation of the roll. Therefore, the heater disposed between the roll and the processing center, which serves to heat the unwound web, may act over different lengths of time on different segments of the web. This in turn leads to the amount of heat to be applied to the web not being able to be exactly determined in advance. As a consequence of this, the web is not heated uniformly, which leads to impairment of quality in the deep-drawing product.

SUMMARY OF THE INVENTION

The present invention has the basis object of providing a heating device of the above type, as well as a process for controlling the heating device by means of which the webs can be heated to and maintained at an exactly predetermined temperature in all their zones.

In the heating device according to the present invention, a first drivable roller pair for pulling the web off from the roll is disposed between the holder and the heater, i.e., in the direction in which the web is pulled off in front of the heater, and a second drivable roller pair for advancing the web pulled off is disposed after the heater. Thus, the web is pulled off from the roll and fed to the heater continuously by means of the first roller pair. The second roller pair removes the web being heated from the heating device. Elongation of the heated web by an additional amount, which is not constant, which occurred until now in the case of the roll being driven by pulling the heated end of the web, is hereby avoided.

The web is driven in the simplest manner by means of roller pairs between which the web is guided. The rollers opposing each other are adjacent the web on both sides. In order to ensure the synchronous running of the two rollers, only one of the two rollers is driven in all cases. The other roller serves as the opposed support and rolls passively as a consequence of the moving web. In order to render the pressing force exerted by the rollers on the web variable and to make it possible for webs with various thicknesses to run through the heating device, the two rollers can be displaced relative to one another.

As a consequence of the longitudinal expansion of the web caused by the heating, the length of the web section passing per unit time over the second roller pair is greater than that of the web section passing per unit time over the first roller pair. In order to drive both driven roller pairs by a single motor and to still ensure different peripheral speeds of the different rollers, he diameter of the driven roller of the second roller pairs is greater than the diameter of the driven roller of the first roller pair. The peripheral speed of the roller with the greater diameter is thus greater than the peripheral speed of the roller with the smaller diameter. A change in the peripheral speed can also be brought about by driving the driven roller of the second roller pair via a bevel gear attached to it. Depending on the point at which the envelope of the cone is in contact with the drive belt, the speed of rotation of the bevel gear and hence also the speed of rotation of the roller change.

The quality of the heating of the web can also be improved by the continuous temperature control of the web being heated. Thus, a temperature measuring means for the web being heated is disposed between the heater and the second roller pair, and is disposed there at as great a distance from the heater as possible, in such a way that the web surface temperature determined—the web surface has already cooled somewhat on its outer sides, more so than in its core area—is at most only slightly higher than the core temperature of the web, and is normally lower than this temperature. Since the web core temperature shows hardly any changes during the period during which the web is advanced from the temperature measuring means to a processing center disposed after a heating device, it is possible, once the optimal web core temperature has been established by means of additional heaters which are disposed in front of the processing center, to bring the two outer sides of the web and consequently also the web as a whole the optimal processing temperature.

The process according to the present invention for controlling the heating device is characterized in that at given actual temperatures of the heaters, the actual temperatures of the web are determined over the width of the web by means of the temperature measuring means, the actual temperatures are compared with a predetermined set point for the web, and new set points are set for the heaters in the case of deviation from the set point for the web. The set temperatures for the heaters are regularly higher than the set temperature of the web in the area of the temperature measuring means. The difference in temperature is dependent on the speed, the material, the layer structure and the width of the web, as well as the climatic conditions of the environment and the length of the web section between the heaters and the temperature measuring means.

In order to detect defects, such as holes and the like, in the web, temperatures determined by the temperature sensor of the temperature measuring means which deviate from the set web temperature by more than twenty percent are left out of consideration in the temperature control of the heaters.

Since the web is subject to intense cooling toward the edges not only perpendicular to its flat surface, but also in its plane, it has different temperature zones over its width. In order to determine this thermal profile along the width of the web, the temperature measuring means is arranged movably crosswise over the web at a constant distance from it, according to an advantageous improved variant of the present invention.

To optimize the heating device, it is also advantageous to use only heaters which emit an infrared radiation of a wavelength which is turned to the resonance wavelength of the web material to be heated; this leads to the greatest possible heating energy utilization. Heaters with uniform emitted energy density are, for example, flat ceramic radiant heaters.

THE DRAWINGS

The sole FIGURE shows the cross-section of a heating device according to the present invention, in which a web wound on a roll is heated by means of the heating device and is fed into a processing center.

DETAILED DESCRIPTION

As shown in the drawing, the housing 10 is equipped with a roller 12 in which a roll 14 is held rotatably. A web 18 is wound on the roll in a plurality of layers 16. The web 18 has a width which is many times its thickness. The unwound end of the web 18 is fed to a processing means 20 through the housing 10. The processing means 20 is, e.g., a deep-drawing station.

Within the housing 10 the web 18 is fed through a left and right heater 22, 24 at a spaced location from heaters. Between the holder 12 and heaters 22, 24, the roller 26 is adjacent to the web on the left side as shown in the drawing, and the roller 28 is adjacent on the right side. Both rollers are frictionally engaged with the web 18 so that the web can be pulled off the roll 14 by rotating one of the rollers.

The web exiting at the top from between the heaters 22, 24 is fed downward by three guide rollers 30, 32, 34 in the top zone of the housing 10 and over another guide roller 36 to a second roller pair. This roller pair consists of a top roller 38 as well as a bottom roller 40.

A temperature sensor 44 is attached to a holder 42 in the area of the guide roller 36. The holder 42 in turn is attached to the housing 10. The temperature sensor 44 is directed toward the web 18 and measures its temperature. The temperature sensor 44 is movable on the holder 42 perpendicular to the plane of the drawing, i.e., across the web 18. It is thus possible to determine the temperature profile across the web. The web temperature values thus determined are compared with a desired set temperature for the web in a control unit 54, with which the temperature sensor 44 is connected. Measured temperatures more than twenty percent below the desired temperature are left out of consideration in the heating power control of the heaters 22, 24. Thus defects in the web for example, holes or defective components of the measure device, are unable to influence the control. This control of the heaters is carried out via control wires 58 over which the control unit 54 is connected with heaters 22, 24.

Since the web cools again during the time it takes to move from the heaters 22, 24 into the zone of the temperature sensor 44, the temperature of the heaters 22, 24 must be regularly higher than the web temperature determined by the temperature sensor 44. This is taken into account in the heating power control of the heaters in such a way that if it is desirable to raise the web temperature in the zone of the temperature sensor 44, the temperature of the heaters 22, 24 is raised by a greater amount. The difference in temperature between the heaters and the web in the zone of the temperature sensor 44 is dependent on the speed with which the web is being pulled through the heating device, the layer structure and the width of the web, as well as the temperature conditions in the zone of the heating device and also the length of the web section between the heaters 22, 24 and the temperature sensor 44.

Since the edge zone of the web cool more intensely than the central area of the web, the temperature is not constant over the width of the web. Therefore, both the left heater 22 and the right heater 24 consist of a plurality of hearing elements in the transverse direction so that the edge zones and the central area of the web are supplied with different amounts of heat. Three heating zones in the transverse direction over the web were found to be sufficient for the commercially available web rolls commonly used.

Since the left and right heaters 22, 24 can set to different temperatures via the control unit 54 independently from one another, it is possible to supply much heat for the two external areas of multilayered webs. Web layers consisting of different materials can thus be heated at different temperatures with the heating device.

The right roller 28 as well as the lower roller 40 are connected with a drive roller 48 via a drive chain 46. The drive roller 48 in turn is driven by a motor 50, which is shown schematically. The diameter D2 of the lower roller 40 is slightly larger than the diameter D1 of the right roller 28. The longitudinal expansion of the web during its heating of the heaters 22, 24 is thus taken into account.

To better position the entire heating device in a manufacturing shop, the housing 10 lies on movable transport rollers 52.

The heating device shown is generally suitable for all manufacturing processes involving wound-up web-like materials which are to be exposed to heat during unwinding. They include not only deep-drawing processes, but also drying processes. The materials exposed to heat may consist of a plastic and, e.g., of a textile material alike. The webs may also occur in the form of looped stacks instead of being wound up on rolls. Furthermore, it is also possible to provide a plurality of heaters one after another in the longitudinal direction of the web.

SUMMARY

A heating device for webs to be unwound from rolls comprises a holder 12 for the rotatably support of a roll 14 containing a web 18 wound up on it, as well as heaters 22, 24 for exposing to heat an unwound area of the web. In order to bring webs of any thickness to an exactly predetermined temperature in all their areas, the heating device has a first, drivable roller pair 26, 28 for pulling the web 18 from the roll 14 which said roller pair is disposed between the holder 12 and the heaters 22, 24, i.e., in the direction in which the web 18 is unwound in front of the heaters 22, 24. Furthermore, the heating device has a second drivable roller pair 38, 40 for advancing the unwound web 18 which said roller pair is disposed behind the heaters 22, 24. Furthermore, the heating device has a temperature measuring means 44 in the zone between the heaters 22, 24 and the second roller pair 38, 40.

What is claimed is:

1. In a heating device for webs to be unwound from rolls, comprising a holder for rotatably supporting a roll containing a wound-up web and a heater for supplying heat for an unwound area of said web, the improvement being a first drivable roller pair for pulling the web off from said roll between said holder and said heater in the direction in which the web is pulled off in front of said heater, a second drivable roller pair for advancing the web pulled off downstream from said heaters, one of the rollers of said first roller pair and one of the rollers of said second roller pair being drivable, the other rollers being idle rollers, a roller of each roller pair being disposed in a mutually displaceable manner, the diameter of the driven roller of said second roller pair is greater than the diameter of the driven roller of said first roller pair, and said two drivable rollers being driven by a common drive motor.

2. Heating device in accordance with claim 1, characterized in that said drivable rollers of said second roller pair being driven via a bevel gear attached to it.

3. Heating device in accordance with claim 1, characterized in that said heater consists of two heater units between which the web is passed through and which are adapted to the width of the web.

4. Heating device in accordance with claim 3, characterized in that each of said heater units are provided with a plurality of temperature controllers which are distributed over the width of the web and measure the temperatures of said heater units.

5. Heating device in accordance with claim 4, characterized in that said plurality of temperature controllers comprise three temperature controllers.

6. In a heating device for webs to be unwound from rolls, comprising a holder for rotatably supporting a roll containing a wound-up web and a heater for supplying heat for an unwound area of said web, the improvement being a first drivable roller pair for pulling the web off from said roll between said holder and said heater in the direction in which the web is pulled off in front of said heater, a second drivable roller pair for advancing the web pulled off downstream from said heaters, a temperature measuring means is provided between said heater and said second roller pair for measuring the temperature of the web being heated and said temperature measuring means having a temperature sensor which is disposed movably at a constant distance from and across the web in the direction perpendicular to the direction of advance of the web.

7. Process for controlling a heating device having a first roller pair between a web holder and a pair of heaters for unwinding a web from its roll in the holder and having a second roller pair downstream from the heaters for advancing the web, wherein each pair of heaters is provided with a plurality of temperature controllers which are distributed over the width of the web and control the temperature of the heaters, and wherein a temperature measuring device for the heated web is also provided between the heaters and the second roller pair, the temperature measuring means having a temperature sensor which is disposed movably at a constant distance from the web in the direction perpendicular to the direction of advance of the web, characterized in that at certain actual temperatures of the heaters actual temperatures of the web are determined over the width of the web by a temperature measuring means, comparing the actual temperatures of the web with a predetermined set value of the web, and setting new temperature points for the heaters when there is a deviation from the set value of the web, the temperature set points for the heaters being higher than the desired web temperature in the zone of the temperature measuring means, the difference in the temperatures being dependent on the speed and its material and the layer structure and the width of the web and the climatic environmental conditions and the length of the web section between the heaters and the temperature measuring means.

8. Process in accordance with claim 7, characterized in that the temperatures which are determined by the temperature sensor of the temperature measuring means and deviate from the desired web temperature by more than twenty percent are left out of consideration in controlling the temperatures of the heaters.

* * * * *